United States Patent [19]
Arweiler et al.

[11] Patent Number: 6,064,212
[45] Date of Patent: May 16, 2000

[54] METHOD FOR DETERMINING THE TRANSMISSION CHARACTERISTICS OF AN ELECTRIC LINE

[75] Inventors: Hans Werner Arweiler; Andreas Wolf, both of Berlin, Germany

[73] Assignee: Tektronix, Inc., Wilsonville, Oreg.

[21] Appl. No.: 08/122,444

[22] PCT Filed: Mar. 19, 1992

[86] PCT No.: PCT/DE92/00239

§ 371 Date: Sep. 27, 1993

§ 102(e) Date: Sep. 27, 1993

[87] PCT Pub. No.: WO92/17949

PCT Pub. Date: Oct. 15, 1992

[30] Foreign Application Priority Data

Mar. 27, 1991 [DE] Germany ............................ 41 10 439

[51] Int. Cl.$^7$ .................................................. G01R 27/28
[52] U.S. Cl. ...................... 324/603; 324/615; 702/110
[58] Field of Search .................................. 364/553, 576; 324/603, 615; 702/110

[56] References Cited

U.S. PATENT DOCUMENTS

| | | | |
|---|---|---|---|
| 3,718,813 | 2/1973 | Williams | 364/553 |
| 3,988,667 | 10/1976 | Roth | 324/603 |
| 4,023,098 | 5/1977 | Roth | 324/603 |
| 4,067,060 | 1/1978 | Poussart | 364/553 |
| 4,813,001 | 3/1989 | Sloane | 364/553 |
| 5,025,221 | 6/1991 | Blaess | 324/603 |

OTHER PUBLICATIONS

HP Catalog—1983—pp. 508–510.

*Primary Examiner*—Josie Ballato
*Assistant Examiner*—Jose M. Solis
*Attorney, Agent, or Firm*—Richard L. Mayer; Thomas F. Lenihan

[57] ABSTRACT

The invention relates to a method for determining the transmission characteristics (H(jf)) of an electric line (2) in an ISDN system, in which a test signal (m(t)) is applied to the line (2) at one end, and at the other end of the line (2) the received signal (g(t)) produced owing to the test signal (m(t)) is evaluated.

In order to be able to carry out such a method using a test signal having a crest factor of one with relatively little cost, use is made as test signal of a binary, bipolar random number sequence signal (m(t)) having the crest factor of one, and during a time interval corresponding to the period of the test signal (m(t)) the received signal (g(t)) is scanned and subjected to a Fourier transformation to obtain a spectral signal (G(jf)); the latter is complexly multiplied by a reference spectrum Mi(jf) to obtain an output signal (H(jf)) which represents a measure of the transmission characteristics of the line (31).

17 Claims, 1 Drawing Sheet

METHOD FOR DETERMINING THE TRANSMISSION CHARACTERISTICS OF AN ELECTRIC LINE

The invention relates to a method for determining the transmission characteristics of an electric line in an ISDN system, in which a) a test signal is applied to the line at one end, and b) at the other end of the line the received signal produced owing to the test signal is evaluated by being scanned during a time interval corresponding to the period of the test signal and being subjected to a Fourier transformation to obtain a spectral signal.

In a known method of this type (DE 2,849,119 C2), use is made as test signal of a test pulse which is derived from the superposition of a sequence of harmonic oscillations. In this case, the amplitude values and the phase angles of the individual frequency components are selected with regard to a low crest factor by means of a memory in a signal generator. Given skilful selection, a test pulse with a crest factor of 4.03 can be achieved. The test pulse modified by the device under test is scanned as received signal during a period; the scan values are stored in digital form. Subsequently, a fast Fourier transformation is performed, by means of which it is possible to calculate the amplitude and phase for each harmonic of the test pulse. Using the corresponding stored magnitudes of the non-corrupted test pulses, it is then possible to determine the attenuation or the attenuation distortion of the device under test.

It is the object of the invention to specify a method for determining the transmission characteristics of an electric line in an ISDN system which can be carried out with relatively little cost with respect to the generation of the test signal and with respect to the evaluation of the received signal, and which operates using a test signal having the crest factor of one. In order to determine the transmission characteristics of electric lines in an ISDN (Integrated Services Digital Network) system, there is, specifically, the requirement to operate using a test signal having as far as possible the crest factor of one.

In order to achieve the specified object, in the method, specified at the beginning, according to the invention it is provided that c) to determine the transmission characteristics of an electric line in an ISDN system use is made as test signal of a binary, bipolar random number sequence signal having the crest factor of one, and that d) the spectral signal is complexly multiplied by a reference spectrum to obtain an output signal which represents a measure of the transmission characteristics of the line, the reference spectrum being obtained from the time-inverse test signal.

An advantage of the method according to the invention consists in the use of a binary, bipolar random number sequence signal, because such a signal has the crest factor of one and can be directly generated, for example, using feedback shift registers. Moreover, the parameters of such a signal can easily be held stationary. A further advantage of the method according to the invention consists in that its realization is performed in the image region of the Fourier transformation in which it is possible to implement the mathematical folding operation by the multiplication of two spectra, which is relatively simple to carry out.

It is true that GB Patent 1,160,271 discloses a method for determining a pulse response of an electrical system, in which use is made as test signal of a binary, bipolar random number sequence signal having a crest factor of one, but in this case it is a question in the electrical system of a servo-system, and after traversing the servo-system the test signal is cross-correlated with delayed random number sequence signals obtained from the test signal in each case by means of delays of different length.

Furthermore, in the digital processing of measuring signals it is known in principle (cf., for example, "Technisches Messen tm" ("Technical measurement tm"), volume 54, issue 1/1987, pages 20 to 25, as well as issue 2/1987, pages 66 to 74, "IEEE Transactions on Instrumentation and Measurement", vol. IM-32, No. 3, September 1983, pages 447 to 450 and H. Kaden "Impulse und Schaltvorgange in der Nachrichtentechnik" ("Pulses and switching operations in telecommunications engineering") 1957, pages 261 to 269) to scan a signal during a time interval corresponding to the period of another signal and to subject it to a Fourier transformation to obtain a spectral signal, but these references contain no indication of the use of a binary, bipolar random number sequence signal having the crest factor of one, nor of complex multiplication of the spectral signal obtained by a reference spectrum formed from the time-inverse test signal in order to determine the transmission characteristics of electric lines in an ISDN system. according to the invention to make use as test signal of an individual random number sequence signal, as specified in the book by Tietze/Schenk, "Halbleiter-Schaltungstechnik" ("Semiconductor Circuit Engineering") 1980, pages 509 to 512. However, it is regarded as particularly advantageous with regard to an unnecessary phase synchronization if a periodic random number sequence signal is used as test signal, in particular a $2^n$–m sequence.

In the method according to the invention, it is also possible in addition to the transfer function of the electric line to be investigated to determine the bit errors to be expected, if advantageously g) the received signal is fed via a comparator having a scanning device and a downstream binary correlator to a device for detecting maxima, and h) the output signal of the device for detecting maxima is fed to a bit error display device.

For the purpose of explaining the invention,

Figure 1:
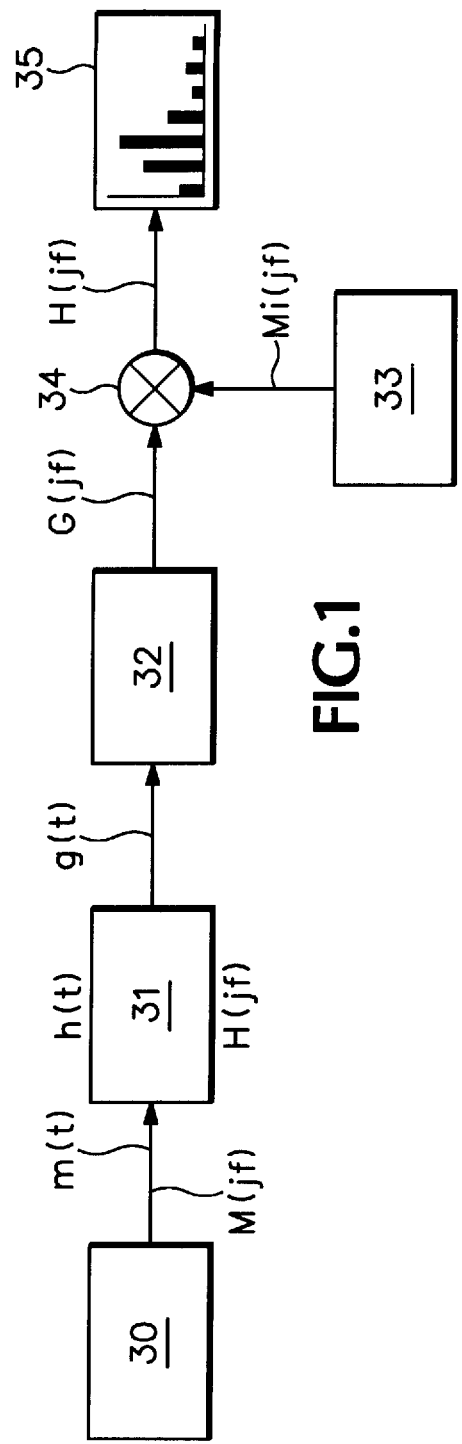
FIG. 1 shows an exemplary embodiment of an arrangement for carrying out the method according to the invention in the form of a block diagram.

In the exemplary embodiment according to FIG. 1, a random number sequence signal m(t) is generated by a generator 30 as a singular or periodic signal, preferably a $2^n$–m sequence. A received signal g(t) is produced at the output of the electric line 31 to be investigated of an ISDN system having an at first unknown weighting function h(t). This received signal g(t) is scanned in a device 32 for the period of the test signal m(t) and subjected to a Fourier transformation. This produces at the output of the device 32 a spectrum G(jf) formed from the spectrum M(jf) of the generator 30 by the transfer function H(jf) of the line 31:

$$G(jf) = H(jf) \cdot M(jf) \qquad (1)$$

If this spectrum G(jf) is complexly multiplied in a multiplier 34 by the spectrum Mi(jf) of a period of the time-inverse test signal mi(t), generated in a device 33, the product represents the transfer function H(jf) in the spectrum, which can be displayed in a device 35.

Figure 2:
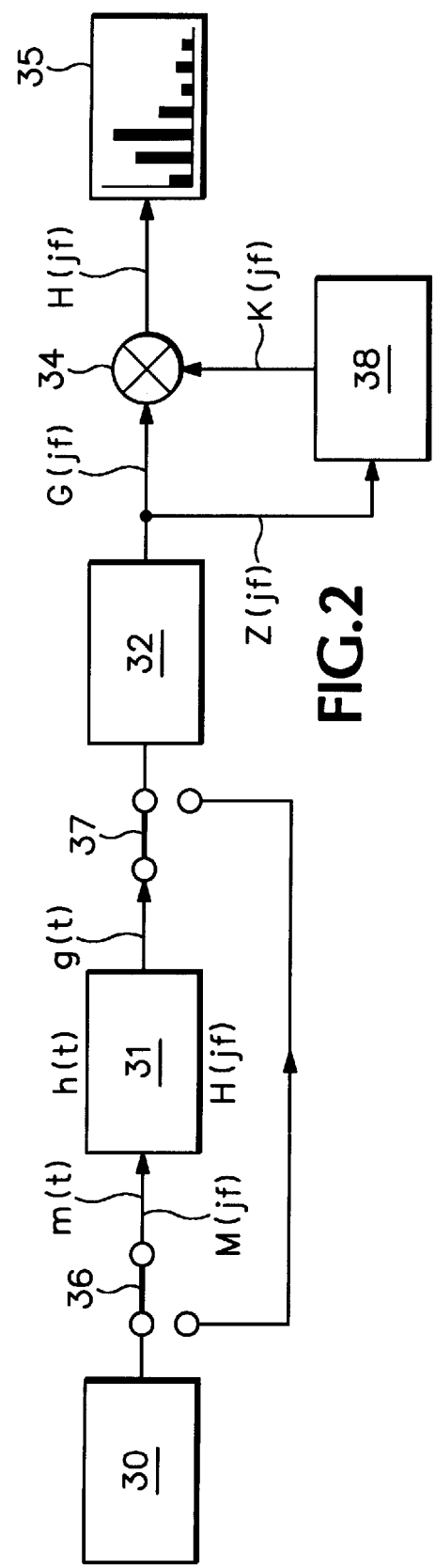
FIG. 2 shows an additional exemplary embodiment of an arrangement for carrying out the method according to the invention in the form of a further block diagram.

The exemplary embodiment according to FIG. 2 serves the purpose of compensating non-ideal situations, that is to say the deviations of an equivalent test signal M(jf).Mi(jf) from an ideal test signal P(jf), which would have the characteristics that P(jf)=1, and the differences relative to the mathematical ideal which are produced owing to the realization in terms of circuitry.

In this exemplary embodiment, which essentially corresponds to that according to FIG. 1, and in which therefore the same modules are provided with the same reference symbols, in a first method step the electric line 31 to be investigated is short circuited out of the position shown by actuating two switches 36 and 37, and the spectrum Z(jf) is determined at the output of the device 32:

$$Z(jf)=N(jf).M(jf) \qquad (2)$$

In this equation (2), N(jf) describes the transfer function of the non-ideal features of the generator 30 and the device 32, and is filed as compensated spectrum K(jf)

$$K(jf)=Mi(jf)/N(jf) \qquad (3)$$

in a device 38 for forming the reference signal.

If the short circuit of the electric line 31 is cleared in a following method step, the spectrum G(jf) respectively produced is complexly multiplied in the multiplier 34 by K(jf), and the transfer function H(jf) of the electric line 31—uninfluenced by non-ideal features—is thereby obtained.

We claim:

1. A method for determining the transmission characteristics of an electric line, the method comprising:

(a) generating a test signal, said test signal comprising a binary bipolar random number sequence signal having a predetermined period and a crest factor substantially equal to one;

(b) deriving an output spectrum by passing said test signal through said electric line, scanning said test signal for a length of time equal to said predetermined period and subjecting said test signal to a Fourier transform;

(c) generating a reference spectrum, said reference spectrum being a frequency domain representation of a time-inverse signal derived from said test signal; and (d) complexly multiplying said output spectrum and said reference spectrum to form a resultant spectrum, said resultant spectrum being representative of said transmission characteristics of said electric line.

2. The method of claim 1 wherein said test signal further comprises an non-periodic random number sequence signal.

3. The method of claim 1 wherein said test signal further comprises a periodic random number sequence signal.

4. The method of claim 1 further comprising the step of displaying said representation of the transmission characteristics of the electric line.

5. An apparatus for determining the transmission characteristics of an electric line, the apparatus comprising:

(a) a signal generator coupled to an input of the electric line, said signal generator capable of producing a random number sequence signal having a predetermined period and a crest factor substantially equal to one;

(b) a first signal processor coupled to an output of the electric line, said first signal processor capable of receiving an input signal, subjecting said input signal to a Fourier transform and outputting a result of said Fourier transform as an output spectrum;

(c) a first switch coupled between said signal generator and the electric line, and a second switch coupled between the electric line and said first signal processor, said first and second switches adapted to create a short-circuit around the electric line when said first and second switches are opened and to permit a current to flow through the electric line when said switches are closed;

(d) a second signal processor coupled to said first signal processor, said second signal processor capable of generating a reference spectrum corresponding to a product of said output spectrum and a signal equivalent to a time-inverse of said random number sequence signal produced by said signal generator; and (e) a multiplier coupled to said first signal processor and said second signal processor, said multiplier capable of complexly multiplying said output spectrum and said reference spectrum to produce a representation of the transmission characteristics of the electric line.

6. The apparatus of claim 5 wherein said signal generator is capable of producing a binary, bipolar random number sequence signal having a $2^n$-m sequence.

7. The apparatus of claim 6 wherein said second signal processor includes a memory capable of storing said reference spectrum.

8. The apparatus of claim 7 further comprising an output device capable of generating a display of said representation of the transmission characteristics of the electric line.

9. A method for determining the transmission characteristics of an electric line, the method comprising:

(a) generating a test signal, said test signal comprising a random number sequence signal having a predetermined period and a crest factor substantially equal to one;

(b) deriving a control spectrum by receiving said test signal for a length of time equal to said predetermined period and subjecting said test signal to a Fourier transform;

(c) generating a compensated spectrum from said control spectrum, said compensated spectrum representing a deviation in said control spectrum due to physical implementation of the method;

(d) deriving a test spectrum by passing said test signal through the electric line, scanning said test signal for a length of time equal to said predetermined period and subjecting said test signal to a Fourier transform; and (e) complexly multiplying said test spectrum and said compensated spectrum.

10. The method of claim 9 wherein said test signal comprises a binary, bipolar random number sequence signal having a $2^n$-m sequence.

11. The method of claim 10 including the step of creating a short-circuit of the electric line to facilitate said generating of said compensated spectrum, and clearing said short-circuit upon completion of said generating of said compensated spectrum.

12. The method of claim 11 wherein the step of generating said compensated spectrum includes storing said compensating spectrum in a memory.

13. The method of claim 12 further comprising the step of displaying said representation of the transmission characteristics of the electric line.

14. The method of claim 13 wherein said test signal comprises a periodic random number sequence signal.

15. An apparatus for determining the transmission characteristics of an electric line, the apparatus comprising:

(a) a first signal generator coupled to an input of the electric line, said first signal generator capable of producing a random number sequence signal having a predetermined period and a crest factor substantially equal to one;

(b) a signal processor coupled to an output of the electric line, said signal processor capable of receiving an input signal, subjecting said input signal to a Fourier transform and outputting a result of said Fourier transform as an output spectrum;

(c) a second signal generator capable of generating a reference spectrum corresponding to a signal equivalent to a time-inverse of said random number sequence signal produced by said first signal generator; and (d) a multiplier coupled to said signal processor and said second signal generator, said multiplier capable of complexly multiplying said output spectrum and said reference spectrum to produce a representation of the transmission characteristics of the electric line.

16. The apparatus of claim 15 wherein said signal generator is capable of producing a binary, bipolar random number sequence signal having a $2^n$–m sequence.

17. The apparatus of claim 16 further comprising an output device capable of generating a visual display of said representation of the transmission characteristics of the electric line.

* * * * *